United States Patent
Bonkowski et al.

(10) Patent No.: US 8,457,019 B2
(45) Date of Patent: Jun. 4, 2013

(54) CONFERENCING THAT BRIDGES VIRTUAL WORLD AND REAL-WORLD MEETING PLACES

(75) Inventors: Edward F. Bonkowski, Bartlett, IL (US); William S. Carter, Round Rock, TX (US); Thomas E. Cook, Essex Junction, VT (US); Neil A. Katz, Parkland, FL (US); Robert S. Smart, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/824,492

(22) Filed: Jun. 28, 2010

(65) Prior Publication Data

US 2011/0317593 A1 Dec. 29, 2011

(51) Int. Cl.
*H04L 12/16* (2006.01)

(52) U.S. Cl.
USPC ......................................................... 370/260

(58) Field of Classification Search
None
See application file for complete search history.

(56) References Cited

U.S. PATENT DOCUMENTS

| | | | |
|---|---|---|---|
| 7,036,082 B1 | 4/2006 | Dalrymple et al. | |
| 7,086,005 B1 | 8/2006 | Matsuda | |
| 7,653,192 B1 * | 1/2010 | Sylvain | 379/202.01 |
| 2007/0260687 A1 | 11/2007 | Rao et al. | |
| 2008/0189619 A1 | 8/2008 | Reed et al. | |
| 2008/0263460 A1 | 10/2008 | Altberg et al. | |
| 2009/0089439 A1 | 4/2009 | Benco et al. | |
| 2009/0089685 A1 | 4/2009 | Mordecai et al. | |
| 2009/0106347 A1 | 4/2009 | Harwood et al. | |

FOREIGN PATENT DOCUMENTS

EP    0797338 B1    3/2006

* cited by examiner

*Primary Examiner* — Dang Ton
*Assistant Examiner* — Ronald H Davis
(74) *Attorney, Agent, or Firm* — Stephen J. Walder, Jr.; Eustus D. Nelson

(57) ABSTRACT

Mechanisms are provided for conference call communication in a virtual world environment. The mechanisms establish a hybrid conference call by establishing a hybrid conference call communication connection between a data based communication conference call server, that handles data based communications with client computing devices, and a telephone conference call server, that handles telephone protocol communications with telephone devices external to the virtual world environment. Communications between client computing devices and telephone devices are converted from data based communications to telephone protocol communications and vice versa using a data based communication conference call server and a telephone conference call server.

19 Claims, 4 Drawing Sheets

CONFERENCING THAT BRIDGES VIRTUAL WORLD AND REAL-WORLD MEETING PLACES

BACKGROUND

The present application relates generally to an improved data processing apparatus and method and more specifically to mechanisms for providing conferencing capabilities that bridge virtual world and real world meeting places.

There has been a surge in the popularity of three-dimensional (3D) virtual world environments, especially in the area of massively multiplayer online (MMO) games. A virtual world environment is a world that exists entirely within the digital virtual space of one or more computing devices and which includes virtual objects, characters, scenery, and other virtual world elements that may be rendered by graphics engines on the computing devices such that a user in the real world may manipulate at least some of the virtual elements of the virtual world through user interface devices. A MMO game is an online computer or console game in which a large number of players interact with one another in a virtual world. In many of these MMO games, players assume the role of a character and take control over most of that character's actions. The virtual world in which these characters are represented as avatars may take many different forms including a fantasy setting, a science fiction universe, or the old west, for example. With the rising acceptance of personal computers, as well as increased graphical capabilities of personal computers and video game consoles, MMO games have become wildly popular around the world. In fact, part of the draw of MMO games is that players from any continent may be online at any given time and may interact with players from other continents or other countries.

Other vehicles for social interaction on the Internet have also become popular, such as chat rooms, message boards, instant messaging clients, Web logs (blogs), photo blogs, and the like. The idea of virtual world environments has expanded beyond MMO games. Popular virtual world environments today provide a manner in which users can interact in a "virtual world" that is not necessarily very different from the "real world." Users may create an avatar that represents them in the virtual world and which may be used to interact with objects, other avatars, and other virtual world elements at the behest of the user. Users may then create an apartment, buy clothing, decorate their apartments, meet with other users, trade items, create items, etc., all within the virtual world.

Virtual world environments and MMO game environments are morphing into corporate collaboration tools, i.e. virtual conferencing. Users of these technologies find these virtual conferencing mechanisms within virtual world environments extremely engaging which allows for more focused meetings online. With such virtual conferencing, the users have a more positive experience than traditional telephone conferencing because they are able to view representations of the other participants, i.e. avatars of the other participants, and use their own avatars to interact with the avatars of the other participants while conducting the virtual conference.

One of the main issues with virtual world and MMO game technology is the need to be present at the meeting in a virtual world in order to participate. That is, in order for users to participate in a virtual conference in a virtual world, the users' avatars typically must be present at a same location within the virtual world and must enable communication between the avatars. This requires that all participants in the virtual conference have access to the virtual world environment, have a virtual world environment representation of themselves, i.e. an avatar, the users must be physically present at their client computers with appropriate hardware available, e.g., speakers, headset, microphone, etc., and must be running the client application for the virtual world environment. Thus, the users that can participate in a virtual world conference are limited by such requirements.

SUMMARY

In one illustrative embodiment, a method, in a data processing system, is provided for conference call communication in a virtual world environment. The method comprises establishing a hybrid conference call by establishing a hybrid conference call communication connection between a data based communication conference call server, that handles data based communications with client computing devices, and a telephone conference call server, that handles telephone protocol communications with telephone devices external to the virtual world environment. The method further comprises receiving, in the data based communication conference call server, a first data based communication associated with the hybrid conference call from a client computing device. Moreover, the method comprises converting the first data based communication to a first telephone protocol communication to generate a converted telephone protocol communication and forwarding the converted telephone protocol communication to one or more telephone devices via the telephone conference call server. In addition, the method comprises receiving, in the telephone conference call server, a second telephone protocol communication associated with the hybrid conference call from a telephone device. The method also comprises converting a second telephone protocol communication to a second data based communication to generate a converted data based communication. The method furthermore comprises forwarding the converted data based communication to one or more client computing devices via the data based communication conference call server.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment. In yet another illustrative embodiment, a system/apparatus is provided. The system/apparatus may comprise a data based communication conference call server and a telephone conference call server coupled to the data based communication conference call server which, together, may perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
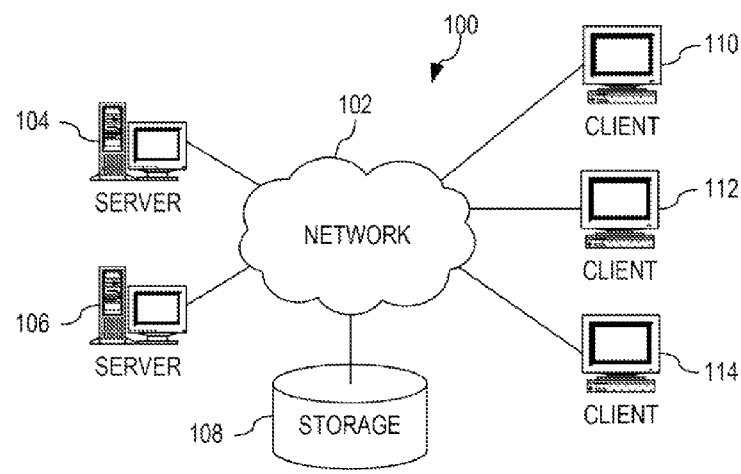
FIG. 1 is an example block diagram of a distributed data processing system in which aspects of the illustrative embodiments may be implemented.

The illustrative embodiments provide a mechanism for providing conferencing capabilities that bridge virtual world and real world meeting places. With the mechanisms of the illustrative embodiments, parcels of virtual land, i.e. locations within the virtual world environment, such as a massively multiplayer online (MMO) game virtual world environment, or sub-portions of the virtual world environment, are parceled off to serve as a virtual meeting place where voice and/or multimedia communication is permitted between participants in the virtual world environment. That is, users having avatars in the virtual world may communicate with each other by moving their avatars to the parceled off sub-portion of the virtual world environment and communicate with each other via voice of IP (VOIP), multimedia communications using one or more of voice, video, graphical, or other type of communication.

In addition, with the mechanisms of the illustrative embodiments, the parcel of land, or sub-portion of the virtual world environment, hereafter referred to as the "media parcel," that is associated with the meeting place is further assigned a conference call phone number and passcode used with conventional telephone communication, or a dialout feature specific for the media parcel. When a user's virtual world participant, i.e. an avatar, enters the media parcel in addition to, or instead of, the normal operation of moving to a separate VOIP channel in the virtual environment, the conference call and passcode are used by the VOIP server to bridge to an existing enterprise wide conference calling system. This bridging operation is done seamlessly such that virtual world participants, or avatars, are not disrupted from their normal activities yet are notified that they have entered a conference call area. Users that are unable to sit at their computers and work in a virtual world environment, or do not have access to the virtual world, such as by having an account and avatar, may use standard or conventional conference call phone number and passcode methods to join the meeting. The presence of another conference call participant via a conventional conference call phone number may be signaled to the other participants present in the virtual world environment by way of an audible and/or visual cue provided to the client computing devices of the various participants, the generation of a "ghost avatar" representation of the conventional conference call phone participants, or the like.

When a user's avatar enters the media parcel, the user may be informed of the conference call telephone number which the user may then use to enter into a conventional conference call with other non-virtual world environment participants. Alternatively, the conference call telephone number and passcode may be automatically used to bridge a VOIP channel associated with the user's avatar with a conventional telephone conference call system so that the user may communicate via VOIP through the virtual world environment but send and receive the communications to a traditional telephone system based conference call system.

In addition to the above, an automatic notification mechanism may be provided that operates in response to the establishment of the media parcel. During the establishment of the media parcel, a user may specify an authorized participant list and the corresponding contact information for the authorized participants where necessary. For example, this authorized participant list may specify avatar identifiers, e.g., character names or the like, for users who have avatars in the virtual world environment, and names, communication identifiers, and/or telephone numbers of users that are authorized to be participants but do not have avatars in the virtual world environment. Furthermore, contact information, such as email addresses, instant messaging addresses, or the like, may be included in the authorized participant list. For users having avatars, the avatar names may be correlated by the automatic notification mechanism with contact information for the corresponding users. This contact information may include virtual mail in the virtual world environment, for example. This information may be used by the automatic notification mechanism to automatically send notifications to users via their contact information, e.g., virtual mail, email messages, instant messages, automated telephone calls, or the like, so as to inform the users of the established virtual meeting place including specifying a location of the media parcel so that avatars may be moved to the media parcel or transported there, conference call-in numbers and passwords, and the like. These and other features of the illustrative embodiments will be described in more detail hereafter.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments are preferably utilized in a distributed data processing environment in which client computing devices provide users access to one or more server computing devices that facilitate the representation of a virtual world environment in which the user's avatars may interact with other avatars and objects within the virtual world environment. The client computing devices access the one or more server computing devices via one or more data communication networks. In order to provide a context for the description of the specific elements and functionality of the illustrative embodiments, FIGS. 1 and 2 are provided hereafter as example environments in which aspects of the illustrative embodiments may be implemented.

Figure 2:
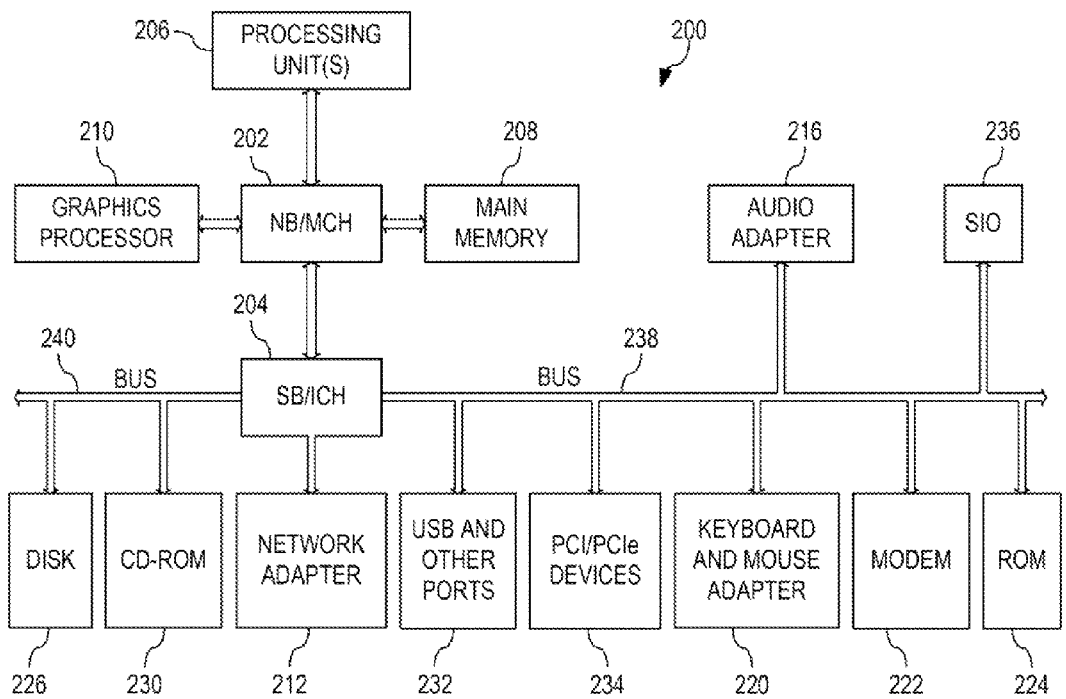
FIG. 2 is an example block diagram of a computing device in which aspects of the illustrative embodiments may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In accordance with the illustrative embodiments, one or more servers, such as servers 104 and/or 106, provide software and hardware facilities for providing a virtual world environment. Client devices, such as clients 110, 112, and/or 114 run client software designed to work in conjunction with the server based software/hardware facilities and communicate with the servers 104 and/or 106 to generate a representation of the virtual world environment on the client computing devices 110, 112, and/or 114. That is, the client computing devices 110, 112, and/or 114 communicate data to, and receive data from, the servers 104 and/or 106 with regard to user inputs to the client computing devices 110, 112, and/or 114 and receive responses back from the servers 104 and/or 106 indicating how the user's input modifies the representation of the virtual world environment and objects within the virtual world environment. The interaction between client devices and server computing devices to generate representations of virtual world environments and to allow a user to interact with the virtual world environments is generally known in the art and thus, a more detailed explanation is not provided herein.

In some known virtual world environment systems, it is possible for a user to establish a parcel of virtual land, i.e. a portion of the virtual world environment, that is associated with a voice of Internet Protocol (VOIP) conference. That is, a user may designate a particular virtual location within the virtual world environment as a meeting place for users to communicate with each other. Users moving their virtual world representations of themselves, i.e. their avatars, into the designated virtual location or portion of the virtual world environment may then communicate with each other via a VOIP communication connection. Only the users whose avatars are within the designated virtual location may communicate with each other over the VOIP connection, thereby providing a semi-private VOIP conference call capability. Of course, depending upon the particular virtual world environment system, the user may be given various options for setting preferences for the VOIP conference call, including a white list of user identifiers or character names for avatars that are permitted to join in the VOIP conference so as to keep unwanted users from accessing the VOIP conference connection.

Figure 3:
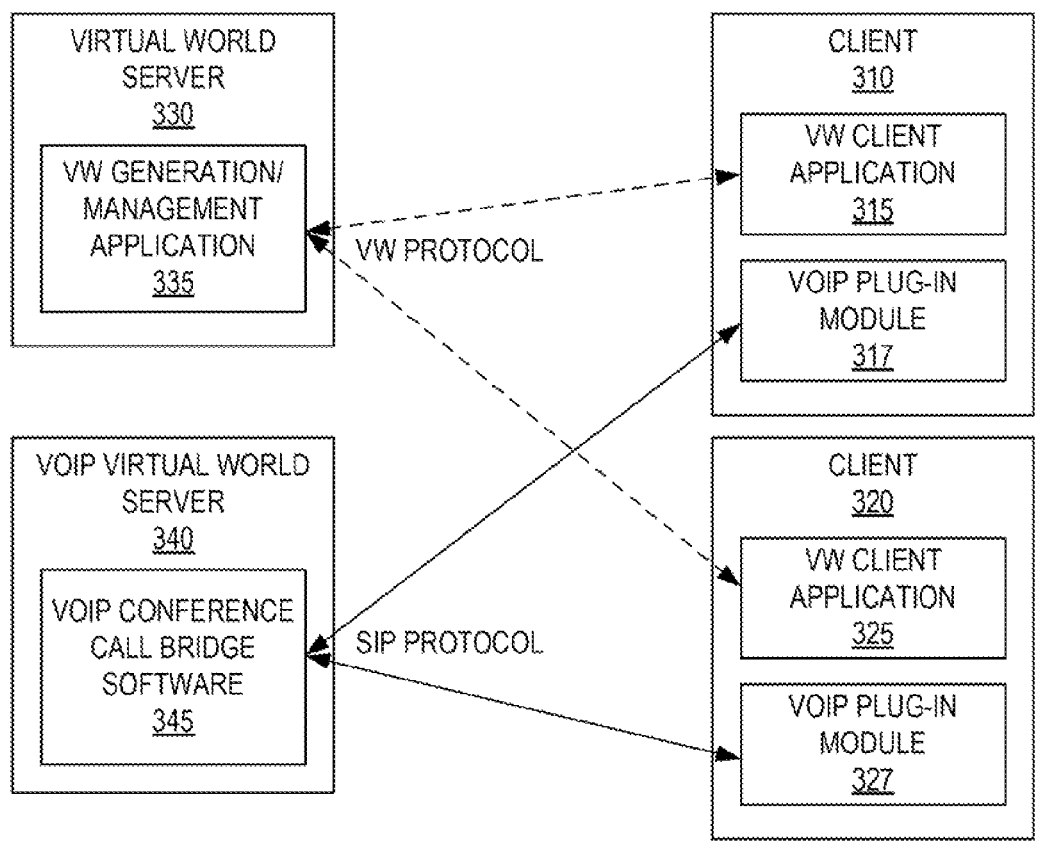
FIG. 3 is an example diagram illustrating one way in which a VOIP conference connection may be established between client computing devices.

FIG. 3 is an example diagram illustrating one way in which a VOIP conference connection may be established between client computing devices. As shown in FIG. 3, client computing devices 310 and 320 run virtual world client software 315 and 325 to generate visual and audible representations of the virtual world environment on the client computing devices 310 and 320. The software 315 and 325 communicate with virtual world generation and management software 335 running on a virtual world server 330 using virtual world protocol to perform the communication. The virtual world protocol specifies the type and format of the data to be communicated to and from the server 330 so that the client software 315 and 325 and the server software 335 know what each other are trying to communicate.

In addition to the virtual world client software 315 and 325, the client computing devices 310 and 320 may also run a VOIP plug-in software module 317 and 327 to allow VOIP communication with other users via the virtual world environment. This VOIP plug-in software module 317 and 327 may communicate with the same server 330, or may communicate with a separate server 340 (as shown), that provides a VOIP conference call capability. That is, the server 340, which is a VOIP virtual world server 340, runs a VOIP conference call bridging software 345 capable of communicating with the VOIP plug-in software modules 317 and 327 on the client computing devices 310 and 320 and directing VOIP communications to other client computing devices 310 and 320 that are involved in the VOW conference call. These VOIP communications may make use of various protocols, one example of which is the Session Initiation Protocol (SIP).

With this configuration, a user of client device 310 may set up a portion of the virtual world environment for use as a meeting place for VOIP conference call communication with other users of the virtual world environment. For example, a user may want to establish a parcel of land, a virtual location in a virtual world environment, or the like, so that the user may communicate with other users of the virtual world environment, such as for a business meeting, guild meeting in a virtual gaming world environment, or the like. The user of client device 310 may then go through the necessary steps to communicate with the VOIP virtual world server 340 to set up the designated virtual location within the virtual world environment. The VOIP virtual world server 340 may then associate an identifier of the virtual location within the virtual world environment with a VOIP conference call communication. As a result, if a user moves his/her avatar into the designated virtual location, the user may initiate a VOIP conference call communication by selecting an option to join the VOIP conference call. As a result of such a selection, the VOIP virtual world server 340 receives a SIP message to initiate a VOIP call in the VOIP conference call.

Once a virtual location, virtual parcel of land, or portion of the virtual world environment is already designated as being associated with a VOIP conference, a user of a client device 310 may move their avatar into the designated virtual location of the virtual world environment that is set aside for VOIP conference call communication. Such a virtual location may be specified in the virtual world environment by creating a meeting room that a user may select from a list of available meeting rooms, identifying the parcel of virtual land by way of a designated texture or graphical representation, or any other suitable way of specifying a virtual location as being set aside for VOIP conference call communication. Once in the designated virtual location, the user may initiate a VOIP call with other participants in the VOIP conference call using SIP or another type of communication protocol.

Thus, with known systems, the ability to initiate a VOIP conference call with other users having a virtual representation in the virtual world environment is provided. However, as mentioned above, this mechanism is limited in that the individuals that may participate in the VOIP conference call must have virtual world environment representations of themselves and thus, must have accounts with the virtual world servers. Furthermore, the participants in the VOIP conference call must be present at the various client computing devices 310 and 320, in order to interact with the virtual world environment so that they may position their avatars within the designated virtual location and initiate the VOIP communication between the client computing device 310 and/or 320 and the VOIP virtual world server 340. Furthermore, the users must have the necessary hardware, e.g., headset, microphone, and the like, available at their client computing device 310 and/or 320, to facilitate the VOIP communication.

However, there are times when a user of the virtual world environment may wish to have a conference call with participants having accounts and representations within the virtual world environment as well as participants that do not. Moreover, there are times when a user may not be able to be present at their client computing device but may wish to participate in a virtual world environment based conference call, such as when the user is traveling, currently in a moving vehicle, or is otherwise unable to access the virtual world environment via a client computing device. There are many other instances in which a user may not be able to get involved in a VOIP conference call through known mechanisms via the virtual world environment and, with known systems, would thus, not be able to participate in the conference call with other users.

The mechanisms of the illustrative embodiments provide software and hardware facilities to address such situations by providing functionality for bridging VOIP conference call mechanisms of virtual world environments with traditional telephone based conference call systems. A user may associate a virtual location in the virtual world environment both with a VOIP conference call and with a traditional telephone conference call number and passcode. As a result, users that are able to access the virtual world environment from their client computing devices may do so via the associated VOIP plug-in modules and interfacing with the VOIP virtual world servers in the manner previously described. Those users that are not able to, or choose not to, access the virtual world environment via a client computing device and VOIP plug-in modules, may communicate with other participants with the conference call via a traditional telephone based conference call number and passcode. As a result, the number of possible participants in conference calls utilizing the virtual world environment is increased and the flexibility for users to use either their client computing devices or more traditional telephone based communications equipment is increased.

Figure 4:
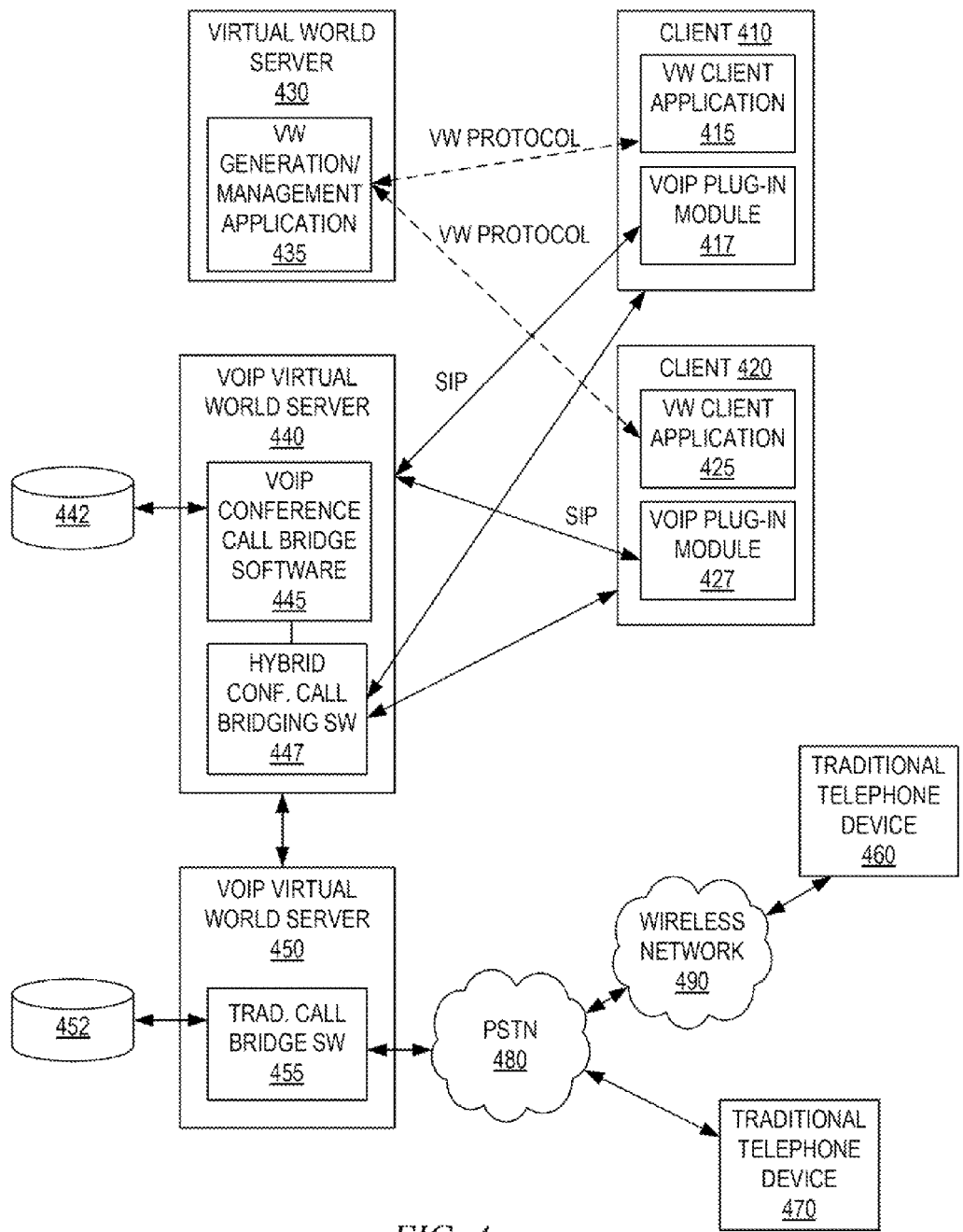
FIG. 4 is an example block diagram of a system having mechanisms to implement a VOIP to traditional conference call bridging functionality in accordance with one illustrative embodiment.

FIG. 4 is an example block diagram of a system having mechanisms to implement a VOIP to traditional conference call bridging functionality in accordance with one illustrative embodiment. As shown in FIG. 4, the system includes a first portion corresponding to the known VOIP virtual world server based system such as shown in FIG. 3 above. That is, this first portion includes client computing devices 410 and 420 running virtual world client software 415 and 425 as well as VOIP plug-in modules 417 and 427. The client computing devices 410 and 420 communicate with a virtual world server 430 to generate a representation of the virtual world environment on the client computing devices using the virtual world client software 415 and 425 and the server software 435. The client computing devices 410 and 420 communicate with the VOIP virtual world server 440 when a VOIP conference call communication is to be performed between users of the virtual world environment whose virtual world environment representations, i.e. avatars, are currently present in a VOIP conference call parceled portion of the virtual world environment. The VOIP conference call bridging software 445 of the server 440 may bridge VOIP communications between users whose avatars are present in the VOIP parceled portion of the virtual world environment.

In addition, the illustrative embodiments provide mechanisms for bridging traditional telephone system with the VOIP conference call bridging capability of the known systems. That is, in addition to the known mechanisms for setting up a VOIP conference call within a virtual world environment, the illustrative embodiments provide additional software capabilities within conference call server software, such as via hybrid telephone conference bridging software module 447, to establish a traditional telephone conference call bridging capability. That is, the VOIP virtual world server 440 runs an additional hybrid telephone conference bridging software module 447, which may be provided as a plug-in module to the VOIP conference call bridging software 445, a separate application working in concert with the software 445, or the like, for bridging between the VOIP conference call bridging software 445 and the traditional conference call mechanisms of a traditional telephone based conference call server 450.

The traditional telephone based conference call server 450 runs traditional telephone conference call bridging software 455 for bridging communications between traditional telephone handsets 460 and 470. The traditional telephone handsets 460 and 470 may be wired or wireless telephone devices that use a public switched telephone network (PSTN) 480 and/or wireless telephone network 490 through which telephone calls are routed to/from one telephone device 460 from/to another telephone device 470. The traditional telephone handsets 460 and 470 typically only provide voice communication over the PSTN 480 and/or wireless telephone network 490 and in general do not communicate via multimedia transmissions of data. However, the illustrative embodiments may also be used with smart phones and other more advanced telephone devices that are capable of multimedia communication via a PSTN 480 and/or wireless communication network 490. For example, the illustrative embodiments may be used with multimedia communications, such as video-phone communications, to/from the telephone devices 460 and 470. Moreover, the illustrative embodiments may be used with VOIP communications from or between desktops, smart phone devices, or the like, for users that are using soft-phone type applications but do not have avatars in the virtual world.

Whether the telephone devices 460 and 470 are capable of multimedia communications or not, it should be kept in mind that the users of the telephone devices 460 and 470 are not able to access the virtual world environment, or choose not to access the virtual world environment, from a client computing device running virtual world client software or VOIP plug-in modules. Thus, instead, the users of telephone devices 460 and 470, if they want to be involved in a conference call with users that are using the VOIP capabilities of the VOIP virtual world server 440, must utilize the bridging capabilities of the traditional telephone based conference call server 450.

When a user of a client computing device 410, for example, wishes to establish a parcel of virtual land in the virtual world environment or otherwise set aside a portion of the virtual world environment for establishment of a conference call, the user may specify such a parcel or portion of the virtual world environment via the VOIP plug-in software 417 in a manner generally known in the art. However, in addition, via the hybrid telephone conference bridging software module 447 of the illustrative embodiments, the user of the client computing device 410 may further request that the conference call have an associated traditional telephone conference call number and passcode so that users that are not able to participate via VOIP within the virtual world environment may still access the conference call through a more traditional conference call mechanism via the traditional telephone based conference call server 450. The user of the client computing device 410 may request such a hybrid communication through accessing the hybrid telephone conference bridging software module 447 such as via a login process, sending a request to the hybrid telephone conference bridging software module 447 from a client based agent (not shown) or plugin module (not shown), or the like.

The user may select an option, for example, via an interface with the hybrid telephone conference bridging software module 447, which may work in concert with the VOIP plug-in module 417 to provide options to the user for establishing the conference call parcel in the virtual world environment, to associate the parcel or portion of the virtual world environment with not only a VOIP conference call but also a traditional telephone conference call to thereby establish a hybrid VOIP to traditional telephone conference call. For example, the hybrid telephone conference bridging software module 447, in response to the user's selection of an option to associate the parcel or portion of the virtual world environment with a traditional telephone conference call, may automatically perform operations to setup a conference call call-in telephone number and passcode with the traditional telephone conference call bridging software 455.

The VOIP virtual world server 440 may associate the request to establish the hybrid VOIP to traditional telephone conference call with an identifier of the parcel or portion of the virtual world environment in a database 442 that stores entries for various conference call parcels in the virtual world environment. The entries in the database may store information identifying the parcel or portion of the virtual world environment, VOIP information for establishing VOIP conference calling between VOIP client computing devices 410 and 420 including a date/time range for the VOIP conference call, an optional listing of participants in the VOIP conference call, such as by way of user identifiers or the like, and other VOIP conference call information. In addition, the database 442 may store additional information for bridging communications to/from the traditional telephone based conference call server 450, as described hereafter. For example, this additional information may include a preconfigured or default conference call number generated and assigned to the parcel, a user specified conference call number and passcode, an authorization list that may be used to specify which avatars and/or users are permitted access to the parcel, or the like. This information may be used by the VOIP virtual world server 440 to perform routing of communications between participants in the hybrid conference call at the client computing devices 410 and 420, as well as the traditional telephone based conference call server 450.

The VOIP virtual world server 440 may forward a request to establish a hybrid conference call to the traditional telephone based conference call server 450, such as in response to the user's selection of an option to associate the parcel or portion of the virtual world environment with a traditional telephone conference call. The traditional telephone conference call bridging software 455 of the traditional telephone based conference call server 450 may associate a traditional telephone call-in telephone number with a conference call and a passcode, as is generally known in the art. This information may be preconfigured or dynamically configured by the avatars in the virtual world for establishing a conference call between traditional telephone devices 460 and 470 as well as the VOIP virtual world server 440. In addition, the traditional telephone conference call bridging software 455 may store in one or more entries of the database 452, an identifier of the VOIP conference call with the traditional telephone conference call such that communications to/from the client computing devices 410 and 420 via the VOIP virtual world server 440 may be properly routed to/from the traditional telephone devices 460 and 470 via the traditional telephone based conference call server 450. The traditional telephone conference call call-in number and passcode may be communicated back to the VOIP virtual world server 440 so that it may be used at the designated time range of the conference call to establish a communication connection between the VOIP virtual world server 440 and the traditional telephone conference call server 450.

The hybrid telephone conference bridging software module 447 may interface with client computing device based address book data structures of a client computing device electronic mail application, instant messaging application, or the like. The user of the client computing device, e.g., client computing device 410, when establishing the hybrid conference call through the selection of options via the interface with the hybrid telephone conference bridging software module 447, may select participants for the hybrid telephone conference call from these address book data structures. As a result, the VOIP virtual world server 440 may receive the identifiers for the participants and may automatically send a message to these participants based on the contact addresses in the address book data structures. For example, an instant message, electronic mail message, or the like, may be sent to the users indicating the date/time of the conference call, the identity of the parcel or portion of the virtual world environment where the hybrid conference call is to take place, and/or the call-in telephone number and passcode for the hybrid conference call in case the users are not able to, or choose not to, access the hybrid conference call via the virtual world environment.

The identification of the participants may be used as a way of establishing an authorized participant list that specifies the participants that may access the media parcel. For example, the authorized participant list may specify avatar identifiers, e.g., character names or the like, for users who have avatars in the virtual world environment, and names, communication identifiers, and/or telephone numbers of users that are authorized to be participants but do not have avatars in the virtual world environment. Furthermore, contact information, such as email addresses, instant messaging addresses, or the like, may be included in the authorized participant list. For users having avatars, the avatar names may be correlated by the automatic notification mechanism with contact information for the corresponding users. This contact information may include virtual mail in the virtual world environment, for example. This information may be used by the automatic notification mechanism to automatically send the messages or notifications to users via their contact information, e.g., virtual mail, email messages, instant messages, automated telephone calls, or the like. The messages or notifications may be uniform for all participants or may be customized based on whether or not the users have avatars in the virtual world environment or not. For example, users that do not have avatars may be given only the common information of time, date, identifiers of other authorized participants, and the telephone based conference call information such as conference call call-in number and passcode. Users that have avatars, may be given the common information and only the virtual world environment information, i.e. an identifier of the location of the media parcel, or may be given both the virtual world environment information and the telephone conference call information in case the user is not able to access the virtual meeting place via their computer using their avatar.

At the designated time for the hybrid conference call, users of client computing devices 410 and 420 may move their virtual world environment representations, i.e. avatars, into the parcel or portion of the virtual world environment to initiate a VOIP conference communication between the users of client computing devices 410 and 420 via the VOIP virtual world server 440 and the VOIP plug-in modules 417 and 427. In response to at least one user's avatar initiating the hybrid conference call by moving their avatar into the parcel or portion of the virtual world environment, the VOIP virtual world server 440 may initiate the conference call connection with the traditional telephone conference call server 450 via the traditional telephone conference call bridging software 455. Alternatively, the establishment of the communication connection between the VOIP virtual world server 440 and the traditional telephone conference call server 450 may be performed based on the particular date/time scheduled for the hybrid conference call. When a current time equals, or is within a particular threshold of, the scheduled start date/time for the hybrid conference call, the VOIP virtual world server 440 may initiate the communication connection with the traditional telephone conference call server 450.

Users of traditional telephone devices 460 and 470 may call into the traditional telephone conference call server 450 using the hybrid conference call call-in number and passcode. Communications from the traditional telephone devices 460 and 470 are made via the PSTN 480 and/or wireless network 490 using traditional telephone and/or wireless telephone communication protocols with the traditional telephone conference call server 450. These communications are then converted to data communications by the traditional telephone conference call bridging software 455 and routed to the VOIP virtual world server 440 using information stored in the database 452. This conversion may involve, for example, converting traditional telephone protocol communications to a VOIP communication protocol. Alternatively, this conversion may be performed by the VOIP conference call bridging software 445 at the VOIP virtual world server 440 rather than at the traditional telephone conference call server 450. The VOIP communications may then be forwarded to users' client computing devices 410 and 420 based on the information maintained in database 442.

Likewise, VOIP communications from the client computing devices 410 and 420 may be routed to the VOIP virtual world server 440 which may then convert these communications to traditional telephone call signals using the VOIP conference call bridging software 445. Alternatively, this conversion can be performed at the traditional telephone conference call server 450 using the traditional telephone conference call bridging software 455. The communications may be routed to the traditional telephone conference call server 450 based on information stored in corresponding entries in the database 442. The traditional telephone conference call server 450 may then route the converted communication signals to the traditional telephone devices 460 and 470 via the networks 480 and 490 using information stored in the database 452 identifying the traditional telephone devices 460 and 470 that are part of the hybrid conference call.

The user of client computing devices 410 and 420 may be informed of the presence of a hybrid conference call participant that is participating via a traditional telephone device by way of a visual and/or audible notification. For example, a textual, graphical, or other visual cue or message may be displayed to users via their client computing devices 410 and 420 to indicate the presence of a traditional telephone device based participant in the hybrid conference call. A representation of the users participating via a traditional telephone device 460 or 470 may be provided on the client computing devices 410 and 420 and may be accentuated when communications are being output on the client computing device 410 and 420 from these other participants, e.g., the representation for the other participant may be highlighted, pulsated, or otherwise conspicuously identified when communications from that participant are being output at the client computing device 410 and 420. In one illustrative embodiment, a ghost avatar may be generated and displayed as being present at the parcel or portion of the virtual world environment corresponding to the hybrid conference call. This ghost avatar, however, would not be controlled by the user of the traditional telephone device 460 or 470 but instead may be controlled by the virtual world server 430 as a non-player character avatar or the like using general scripts or the like to control any movement or interaction with objects in the virtual world environment. Any type of notification mechanism for informing the users having avatars within the virtual world environment of the presence of users that are communicating via traditional telephone devices may be used without departing from the spirit and scope of the illustrative embodiments.

Thus, using the mechanisms of the illustrative embodiments as described above with reference to FIG. 4, bridging between VOIP communication calls within a virtual world environment and traditional conference calling systems is facilitated. In this way, users that are not able, or choose not to, access the virtual world environment via their client computing devices, may still participate in a hybrid conference call using their traditional telephone based communications equipment, e.g., wired or wireless telephone devices. This increases the number of users that may participate in conference calls as well as provides flexibility for users to use various devices to participate in the hybrid conference calls.

It should be appreciated that while the above illustrative embodiments are described with reference to "traditional" telephone devices, as mentioned above, these may involve smart telephone devices, video telephone devices, and the like that also support multi-media communications. These devices may be used to communicate using a hybrid conference call mechanism of the illustrative embodiments as well as the traditional voice-only telephone devices in a similar manner as described above. In addition, if the communications involve multimedia data, this multimedia data may be output at the client computing devices 410 and 420 using appropriate representations within the virtual world environment. For example, if a user of a multimedia telephone device 460 sends a video/stream as part of its communication, this video stream may be output to the client computing devices 410 and 420, such as by generating a virtual screen within the parcel or portion of the virtual world environment. The detection of such multimedia communications may be performed by logic in the VOIP virtual world server 440 so that an appropriate output may be generated, for example.

Figure 5:
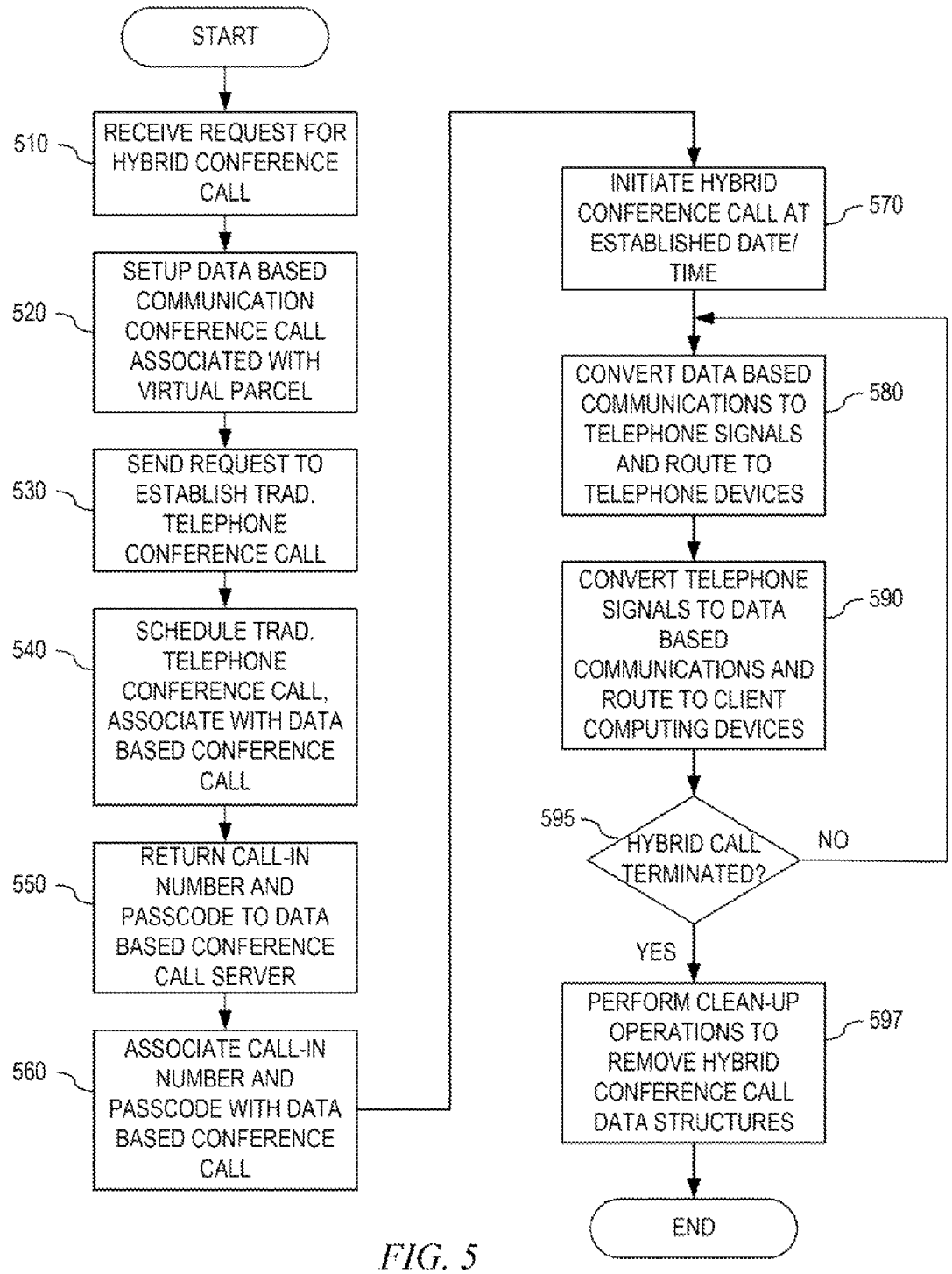
FIG. 5 is a flowchart outlining an example operation for establishing a hybrid conference call in accordance with one illustrative embodiment.

FIG. 5 is a flowchart outlining an example operation for establishing a hybrid conference call in accordance with one illustrative embodiment. The operation starts by receiving, in a data based communication conference call server, a request to establish a hybrid conference call from a client computing device (step 510). This request may be, for example, an actual request transmitted from the client computing device to the server, a user's interaction with the server via an interface to provide information and selections of options for establishing the hybrid communication, or the like. A data based communication conference call, e.g., VOIP conference call, is set up for designated date/time and identifying a particular parcel or portion of a virtual world environment associated with the data based conference call (step 520). A request is sent to a traditional telephone conference call server requesting that the traditional telephone conference call server schedule a traditional telephone conference call at the same date/time (step 530). The traditional telephone conference call server schedules the traditional telephone conference call, assigns it a conference call-in number and passcode, and associates the traditional telephone conference call with the data based communication conference call through appropriate identifiers (step 540).

The conference call call-in number and passcode are returned to the data based communication conference call server (step 550) which associates the conference call-in number and passcode with the data based communication conference call (step 560). Thereafter, within a threshold of the start date/time of the hybrid conference call, or in response to a user of a client computing device initiating the hybrid conference call by moving their avatar into parcel or portion of the virtual world environment at a date/time corresponding to the hybrid conference call, the data based communication conference call server initiates a communication connection with the traditional telephone conference call server using the designated conference call-in number and passcode (step 570). Thereafter, communications from client computing devices accessing the hybrid conference call are routed to other client computing devices in a same data format and are also converted from a data based format to a traditional telephone signal format and forwarded to traditional telephone devices participating in the hybrid conference call via the traditional telephone conference call server (step 580). Furthermore, communications from traditional telephone devices accessing the hybrid conference call are routed to other traditional telephone devices via the traditional telephone conference call server in a same format but are also converted to a data based format and forwarded to client computing devices via the data based communication conference call server (step 590). A determination is made as to whether the hybrid conference call is terminated (step 595). If not, the operation returns to step 570. If so, the operation performs clean-up operations to tear down data structures associated with the hybrid conference call (step 597), and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for conference call communication in a virtual world environment, comprising:
   establishing a hybrid conference call by establishing a hybrid conference call communication connection between a data based communication conference call server, that handles data based communications with client computing devices, and a telephone conference call server, that handles telephone protocol communications with telephone devices external to the virtual world environment;
   receiving, in the data based communication conference call server, a first data based communication associated with the hybrid conference call from a client computing device;
   converting the first data based communication to a first telephone protocol communication to generate a converted telephone protocol communication;
   forwarding the converted telephone protocol communication to one or more telephone devices via the telephone conference call server;
   receiving, in the telephone conference call server, a second telephone protocol communication associated with the hybrid conference call from a telephone device;
   converting the second telephone protocol communication to a second data based communication to generate a converted data based communication; and
   forwarding the converted data based communication to one or more client computing devices via the data based communication conference call server, wherein establishing the hybrid conference call comprises:
   associating a virtual meeting place with a location within the virtual world environment, wherein within the virtual meeting place a first set of users of virtual world environment avatars perform voice communication with each other using the data based communications; and
   associating a conventional telephone number conference call call-in number and passcode with the location within the virtual world environment, wherein a second set of users that do not have avatars in the virtual world environment communicate with the first set of users by dialing into the hybrid conference call using the call-in number and passcode and performing voice communication using telephone protocol communications.

2. The method of claim 1, wherein a user in the first set of users joins the hybrid conference call in response to the user in the first set of users moving their virtual world environment avatars into the location associated with the virtual meeting place.

3. The method of claim 1, wherein, in response to a user in the second set of users joining the hybrid conference call by dialing the call-in number and passcode, a notification is provided to other users in the first and second set of users.

4. The method of claim 3, wherein the notification includes a visual notification being presented to the first set of users via client computing devices being used by the first set of users.

5. The method of claim 3, wherein, in response to the user in the second set of users joining the hybrid conference call, an avatar for the user in the second set of users is automatically generated in the virtual meeting place.

6. The method of claim 5, wherein the avatar for the user in the second set of users is a ghost avatar that represents the user in the virtual world environment but is not controllable by the user in the second set of users.

7. The method of claim 1, further comprising:
   in response to establishing the virtual meeting place, automatically sending notifications to the first set of users and second set of users with information identifying, for the first set of users, the location in the virtual world environment associated with the virtual meeting place, and identifying, for the second set of users, the conference call call-in number and passcode associated with the location in the virtual world environment.

8. The method of claim 1, wherein the data based communication is a voice over internet protocol (VOIP) communication.

9. The method of claim 1, wherein the virtual world environment is a massively multiplayer online game virtual world environment.

10. A system, comprising:
    a data based communication conference call server; and
    a telephone conference call server coupled to the data based communication conference call server, wherein:
    a hybrid conference call is established by establishing a hybrid conference call communication connection between a data based communication conference call server, that handles data based communications with client computing devices, and a telephone conference call server, that handles telephone protocol communications with telephone devices external to the virtual world environment;
    the data based communication conference call server:

receives a first data based communication associated with the hybrid conference call from a client computing device;

converts the first data based communication to a first telephone protocol communication to generate a converted telephone protocol communication; and forwards the converted telephone protocol communication to one or more telephone devices via the telephone conference call server; and the telephone conference call server:

receives a second telephone protocol communication associated with the hybrid conference call from a telephone device;

converts the second telephone protocol communication to a second data based communication to generate a converted data based communication; and forwards the converted data based communication to one or more client computing devices via the data based communication conference call server, wherein the hybrid conference call is established by:

associating a virtual meeting place with a location within the virtual world environment, wherein within the virtual meeting place a first set of users of virtual world environment avatars perform voice communication with each other using the data based communications; and associating a conventional telephone number conference call call-in number and passcode with the location within the virtual world environment, wherein a second set of users that do not have avatars in the virtual world environment communicate with the first set of users by dialing into the hybrid conference call using the call-in number and passcode and performing voice communication using telephone protocol communications.

11. The system of claim 10, wherein a user in the first set of users joins the hybrid conference call in response to the user in the first set of users moving their virtual world environment avatars into the location associated with the virtual meeting place.

12. The system of claim 10, wherein, in response to a user in the second set of users joining the hybrid conference call by dialing the call-in number and passcode, a notification is provided to other users in the first and second set of users.

13. The system of claim 12, wherein the notification includes a visual notification being presented to the first set of users via client computing devices being used by the first set of users.

14. The system of claim 12, wherein, in response to the user in the second set of users joining the hybrid conference call, an avatar for the user in the second set of users is automatically generated in the virtual meeting place.

15. The system of claim 14, wherein the avatar for the user in the second set of users is a ghost avatar that represents the user in the virtual world environment but is not controllable by the user in the second set of users.

16. The system of claim 10, further comprising:

in response to establishing the virtual meeting place, automatically sending notifications to the first set of users and second set of users with information identifying, for the first set of users, the location in the virtual world environment associated with the virtual meeting place, and identifying, for the second set of users, the conference call call-in number and passcode associated with the location in the virtual world environment.

17. The system of claim 10, wherein the data based communication is a voice over interne protocol (VOIP) communication.

18. The system of claim 10, wherein the virtual world environment is a massively multiplayer online game virtual world environment.

19. A computer program product comprising a non-transitory computer readable storage medium having a computer readable program stored therein, wherein the computer readable program, when executed on a data processing system, cause the data processing system to:

establish a hybrid conference call by establishing a hybrid conference call communication connection between a data based communication conference call server, that handles data based communications with client computing devices, and a telephone conference call server, that handles telephone protocol communications with telephone devices external to the virtual world environment;

receive, in the data based communication conference call server, a data based communication associated with the hybrid conference call from a client computing device;

convert the data based communication to a telephone protocol communication to generate a converted telephone protocol communication;

forward the converted telephone protocol communication to one or more telephone devices via the telephone conference call server;

receive, in the telephone conference call server, a telephone protocol communication associated with the hybrid conference call from a telephone device;

convert the telephone protocol communication to a data based communication to generate a converted data based communication; and forward the converted data based communication to one or more client computing devices via the data based communication conference call server, wherein the hybrid conference call is established by:

associating a virtual meeting place with a location within the virtual world environment, wherein within the virtual meeting place a first set of users of virtual world environment avatars perform voice communication with each other using the data based communications; and associating a conventional telephone number conference call call-in number and passcode with the location within the virtual world environment, wherein a second set of users that do not have avatars in the virtual world environment communicate with the first set of users by dialing into the hybrid conference call using the call-in number and passcode and performing voice communication using telephone protocol communications.

* * * * *